United States Patent Office 3,437,263
Patented Apr. 8, 1969

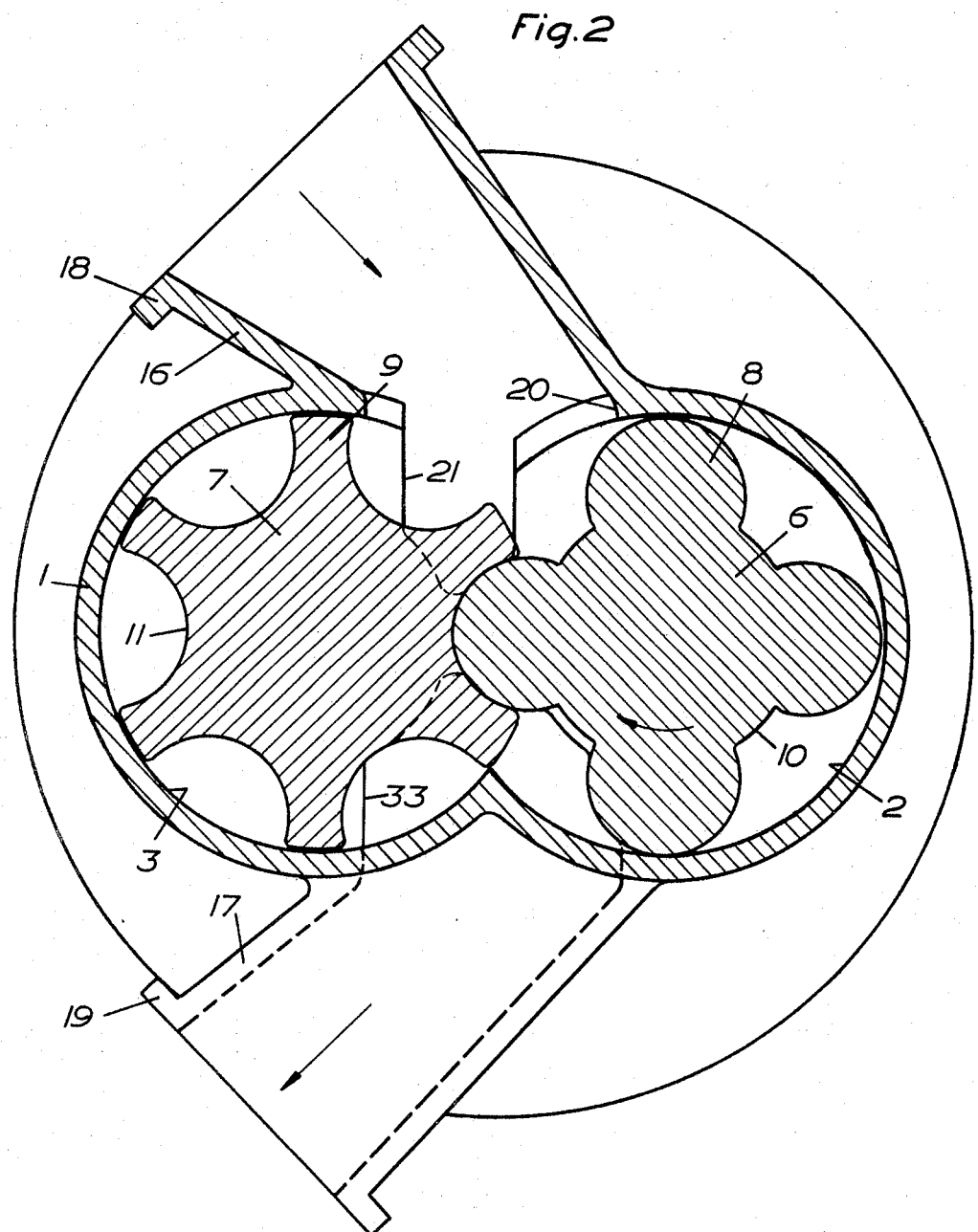

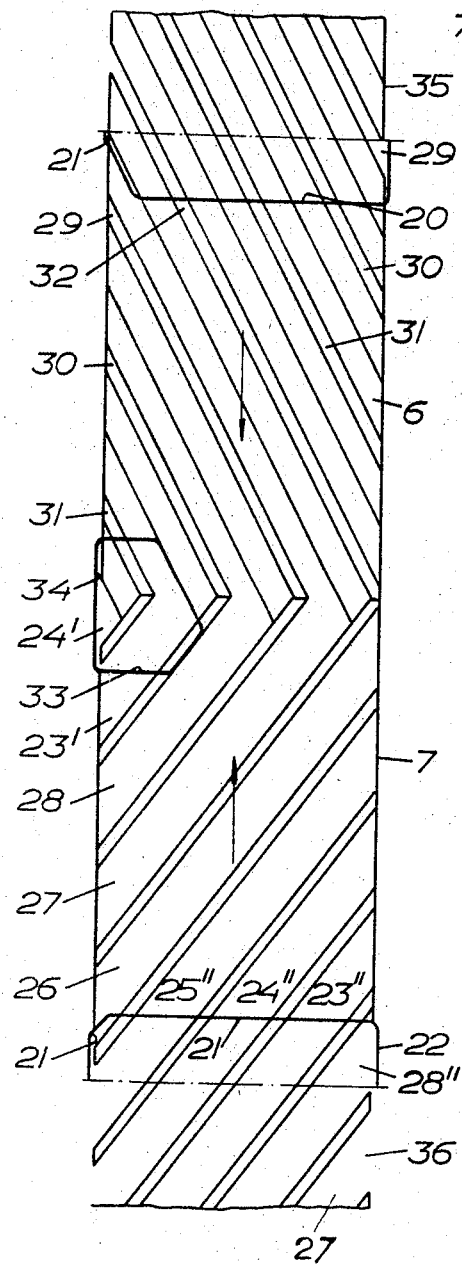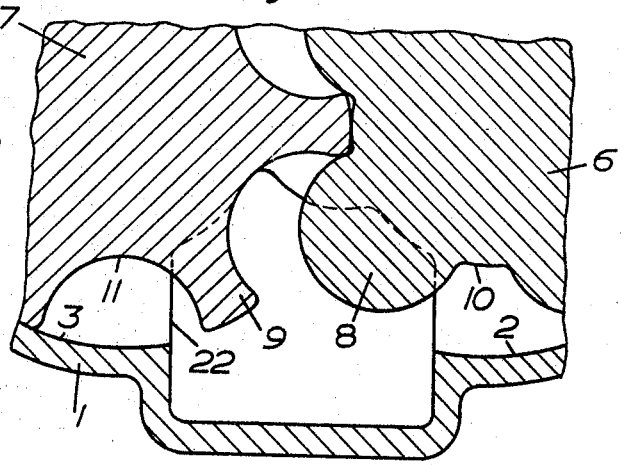

3,437,263
SCREW ROTOR MACHINES
Jan Edvard Persson, Ektorp, Sweden, assignor to Atlas Copco Aktiebolag, Nacka, Sweden, a corporation of Sweden
Filed June 22, 1966, Ser. No. 564,468
Int. Cl. F04c 17/12; F01c 1/16
U.S. Cl. 230—143
10 Claims

ABSTRACT OF THE DISCLOSURE

A rotary device in which intermeshing helical main and gate rotors cooperate with each other and with an enclosure housing to compress or expand, as the case may be, a working fluid as it is being passed from a low pressure inlet port towards a high pressure outlet port. The wrap angle of the main rotor threads is selected so as to be effective to start compression of the working fluid before the outlet port is closed, when the device is operated as a compressor, and effective to cause the inlet port to open before completion of the expansion when the device is operated as an expander or motor.

Figure 1:
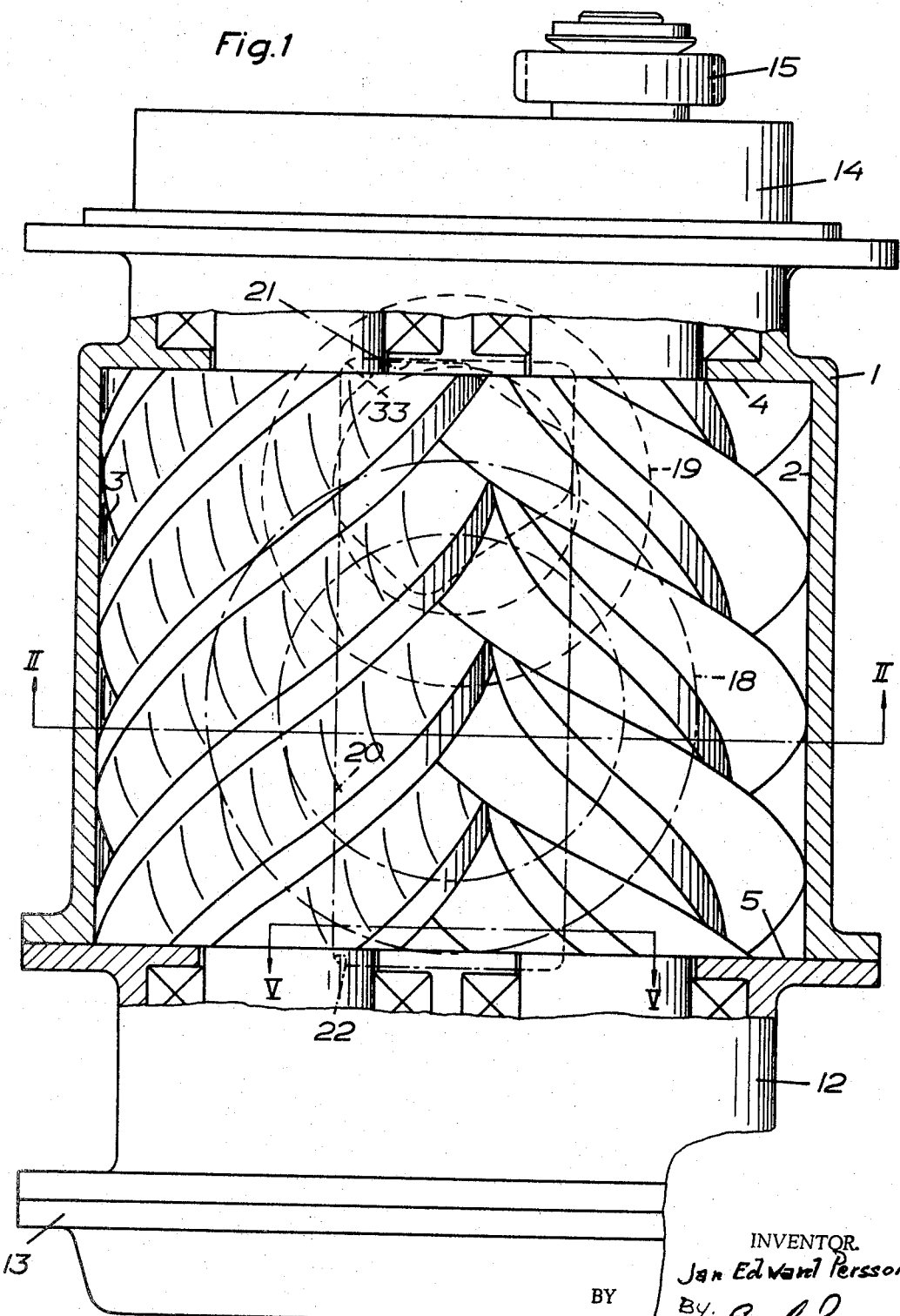

This invention relates to screw rotor machines having a housing forming intersecting cylindrical walls with parallel axes and end walls which together with said cylindrical walls define intersecting cylindrical chambers, main and gate rotors having intermeshing helical threads and grooves and cooperating with said walls to form travelling fluid pockets and mounted for rotation in said housing. In machines of this type which may be screw compressors, screw motors or other screw rotor machines the inlet and outlet ports usually comprise radial as well as substantial axial port portions. It has previously been suggested by Boestad in his U.S. Patent 2,474,653 and equivalent foreign patents to provide radial inlet and outlet ports which extend axially along a part of the cylindrical walls of the machine housing. Boestad combines a radial inlet port extending over about 90% of the length of the cylindrical walls with a large axial inlet port which covers about ¾ of the end surface of the main rotor and about half the end surface of the gate rotor and therefore to a great extent the grooves of the compressor rotors according to Boestad are filled axially from the end wall port. In Boestad's compressor the grooves of the rotors are filled from substantially both ends of each groove, partly from the axial and partly from the radial inlet openings. The present invention involves improvements in the porting arrangement of screw rotor machines of the above type and also in the design of the screw rotors which improvements result in a simplified design and a simple and convenient shape of the ports as well as a favourable arrangement of the inlet and outlet conduits of a machine of this type. One object of the invention is to obtain this simplified design and still to increase the efficiency of the machine. For the above and other purposes I provide in a machine of the type hereinabove described a low pressure radial port in the cylindrical walls extending all the way from one end wall to the other end wall, a first fluid conduit in the housing in flow communication with the cylindrical chambers of the machine through said low pressure port, a high pressure radial port in the cylindrical walls at a side of the common plane through the rotor axes opposite to the low pressure port extending from one end wall part of the way towards the other end wall, and a second fluid conduit in the housing in flow communication with said chambers through said high pressure port. I also provide minor axial ports for cooperation with the radial ports in order to take care of fluid volumes with undesirable pressures. I furthermore increase the wrap angle of the main rotor from the conventional 300° to about 360° or more, and it has been found that the wrap angle may with advantage be something between 330° and 450° in connection with this invention. This increase of the wrap angle can be achieved in different ways, i.e. by increasing the ratio between length and diameter of the rotors. It can also be achieved by reducing the lead angle of the screw rotor threads.

Figure 4:
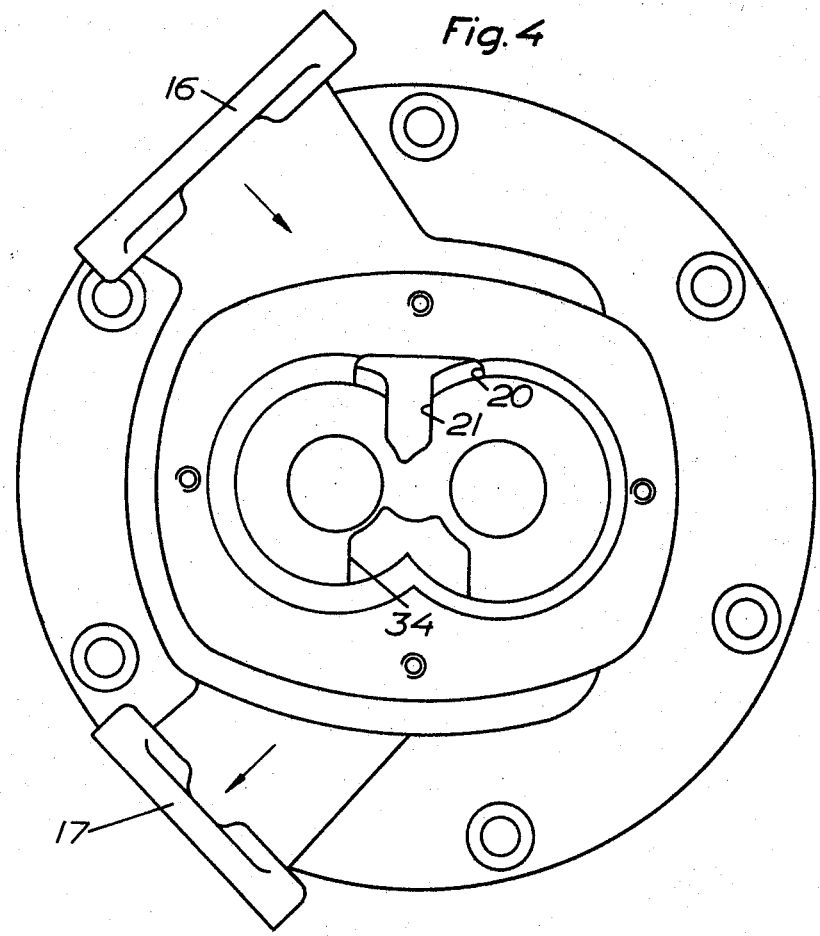

In the accompanying drawings one embodiment of a screw compressor according to the invention is illustrated by way of example. FIG. 1 is a plan view and partial horizontal section of a single stage screw compressor according to the invention. FIG. 2 is a transverse section of the screw rotor compressor according to FIG. 1 substantially on lines II—II in FIG. 1. FIG. 3 is a diagrammatic development of the compressor housing and rotors and illustrates the radial ports as well as the travelling pockets of the main and gate rotors and the intermeshing rotor portions. FIG. 4 is an end view more in detail of the compressor in FIG. 1 with the lower end wall and the rotors taken away, and FIG. 5 is a partial end view looking downwards on lines V—V in FIG. 1.

The screw rotor machine illustrated in the drawings is a single stage screw compressor having a housing 1 which forms intersecting cylindrical walls 2 and 3 with parallel axes and end walls 4 and 5 which together with the cylindrical walls define intersecting cylindrical chambers. A main rotor 6 and a gate rotor 7 having helical threads 8, 9 and helical grooves 10, 11 are mounted for rotation in the housing 1, 12 is a bearing housing which also forms the end wall 5 and which carries an end cover 13. 14 is a bearing housing provided at the opposite end of the housing 1 and 15 indicates a drive pinion through which the main rotor may be driven by any suitable motor.

The housing 1 is provided with inlet and outlet conduits 16 and 17 which are provided with flanges 18 and 19 which lie in planes perpendicular to each other and which serve to connect the compressor to suitable pipe conduits in a compressor unit. The conduits 16 and 17 are directed substantially at 45° against a common plane through the axes of the rotors. The conduit 16 is furthermore directed towards the grooves 10 of the main rotor and the conduit 17 is directed from said grooves, so that some of the kinetic energy of the pressure fluid passing the main rotor may be utilized. The conduit 16 communicates with the cylinder chambers 2, 3 through a substantially radial inlet port 20 which extends all along the cylindrical chambers 2, 3 in the housing 1 and which forms the major inlet port area. The shape of the port 20 is obvious from FIGS. 1 and 3. As obvious from FIGS. 1 and 3 the port 20 extends over the whole length of the cylindrical chambers 2, 3 and in the illustrated embodiment the port 20 is combined with a small axial inlet port 21 at the high pressure end of the compressor and a small axial inlet port 22 at the low pressure end of the compressor as obvious from FIG. 5. The small axial port portions 21 and 22 do not serve to admit any substantial quantity of fluid to the cylinder chambers 2, 3 but only to avoid a delayed opening of the inelt port and building up of undesirable high pressures during the operation of the compressor.

It would be obvious from FIG. 3 that upon rotation of the rotors as indicated by the arrows the grooves 23″, 24″ and 25″ are successively filled with working fluid through the port 20 and similarly the grooves 30, 31 and 32 of the main rotor are filled through the radial port 20. The gate rotor has grooves 23, 24, 25, 26, 27, 28 and the main rotor has grooves 29, 30 31, 32. The gate rotor groove portions in communication with the inlet carry a (″) and those communicating with the outlet a (′). In the diagrammatic illustration in FIG. 3 the gate rotor groove portions 23″, 24″, 25″ and the main rotor grooves 30, 31, 32 are just being filled from the radial inlet port 20. The fluid in gate rotor groove 26 is just being shut-off from the inlet port 20 and said fluid is subjected to peripheral transportation only. In the groove 27 compression has just started by the main rotor thread engaging said groove and in groove portion 28 compression has been continued substantially to outlet pressure in exhaust or outlet port 33. In the above mentioned compressor by Boestad, which has an axial port covering about ¾ of the main rotor end and about half the gate rotor end, fluid flow during the inlet period is to a great extent along the grooves whereas according to the present invention the grooves are filled from the radial port 20 and substantially no movement of the fluid along the grooves of the rotors occurs before compression begins. This results in less turbulence and reduced losses. Furthermore, the invention makes it possible to increase the wrap angle of the main rotor to about 360° or more if desired. Another advantage of the invention is that the losses through leakage are reduced. The greater wrap angle may be utilized for increasing the length of the rotors and maintaining the lead of the rotor threads. For instance, a diameter-length ratio between 0.8 and 0.4 may be used, and preferably between 0.7 and 0.5. This means a bigger volume handled while most of the losses are constant. The efficiency of the machine is hereby improved. The great wrap angle may also be utilized for reducing the lead angle with maintained length of the rotors and in this latter case the optimal speed of the rotors will be increased with the same final result. A lead angle less than 45° has been found proper. The increased wrap angle makes it possible to improve the sound dampening of the compressor. The axial ports 21, 22 only serve to avoid suction pockets during the inlet period and undesirable high pressures being built up in otherwise closed pockets at the end of the compression and delivery cycle. 35 and 36 are the intermeshing rotor portions.

The outlet port 33 as mentioned above is also provided with parallel sides extending parallel to the axes of the bores 2 and 3 of the compressor. The outlet port is substantially radial but is combined with an axial port portion 34 which in conventional manner prevents the formation of pockets in which undesirable high pressures occur. From a review of FIG. 4 it would be obvious that leakage conditions over the axial end surfaces of the rotors are greatly improved as compared with conventional screw rotor compressors or compressors as illustrated in the above mentioned Boestad patent.

The invention above described and illustrated in the drawings should only be considered as an example and may be modified in different ways within the scope of the following claims.

What I claim is:
1. A screw rotor machine having a housing forming intersecting cylindrical walls with parallel axes and end walls which together with said cylindrical walls define intersecting cylindrical chambers and main and gate rotors with intermeshing helical threads and grooves and cooperating with said walls to form travelling fluid pockets and mounted for rotation in said housing, a low pressure radial port in said cylindrical walls extending substantially from one said end wall to said other end wall, a first fluid conduit in the housing in flow communication with said chambers through said low pressure port, a high pressure radial port in the cylindrical walls at the opposite side of the common plane through the rotor axes to said low pressure port extending from one end wall part of the way towards said other end wall, a second fluid conduit in the housing in flow communication with said chambers through said high pressure port, said main rotor threads having a wrap angle at the pitch circle ranging between 330° and 450° effective to commence compression in a main rotor groove before the low pressure port to said groove is closed, and when the machine is operated as a compressor, and effective to open the low pressure port to a main rotor groove before the expansion is finished in said groove, when the machine is operated as an expander or motor.

2. A screw rotor machine according to claim 1, in which said low pressure radial port has parallel sides extending parallel to the parallel axes of the cylindrical walls.

3. A screw rotor machine according to claim 1, in which said high pressure radial port has parallel sides extending parallel to the parallel axes of the cylindrical walls.

4. A screw rotor machine according to claim 1, in which the main rotor has a diameter-length ratio between 0.8 and 0.4, preferably between 0.7 and 0.5.

5. A screw rotor machine according to claim 1, in which the lead of the main rotor thread is about 45° or less.

6. A screw rotor machine according to claim 1, in which said first conduit and said second conduit extend at an angle about 45° to each side of the common plane through the rotor axes so that the fluid flow to and from the main rotor grooves is deflected as little as possible on its passage between said grooves and conduits.

7. A screw rotor machine according to claim 6, in which the first and second conduits are provided each per se with a connecting flange for connecting the machine to inlet and outlet piping, said flanges being disposed in planes at right angles.

8. A screw compressor having a housing forming intersecting cylindrical walls with parallel axes and end walls which together with said cylindrical walls define intersecting cylindrical chambers, main and gate rotors having intermeshing helical threads and grooves and cooperating with said walls to form travelling fluid pockets and mounted for rotation in said housing, a radial inlet port in said cylindrical walls extending all the way from one said end wall to said other end wall, an inlet conduit in the housing in flow communication with said chambers through said inlet port, a radial outlet port in the cylindrical walls extending from one end wall port of the way towards the other end wall, an outlet conduit in the housing in flow communication with said chambers through said outlet port, complementary axial inlet and outlet ports communicating with the inlet and outlet conduits, respectively, said radial inlet port having sides parallel with the rotor axes and said complementary axial inlet port having a width not greater than the radial inlet port and said main rotor threads having a wrap angle at the pitch circle between 330° and 450°.

9. A screw rotor machine having a housing forming intersecting cylindrical walls with parallel axes and end walls which together with said cylindrical walls define intersecting cylindrical chambers, main and gate rotors having intermeshing helical threads and grooves and cooperating with said walls to form travelling fluid pockets and mounted for rotation in said housing, a radial inlet port in said cylindrical walls forming the major inlet port area, an inlet conduit in the housing in flow communication with said chambers through said inlet port, a radial outlet port in the cylindrical walls, an outlet conduit in the housing in flow communication with said chambers through said outlet port, and said main rotor having a wrap angle between 330° and 450°, a diameter-length ratio of the thread portion between 0.8 and 0.4, and a lead angle at the pitch circle not materially exceeding 45°.

10. A screw rotor machine having a housing forming intersecting cylindrical walls with parallel axes and end walls which together with said cylindrical wall define intersecting cylindrical chambers, main and gate rotors having intermeshing helical threads and grooves and cooperating with said walls to form travelling fluid pockets and mounted for rotation in said housing, a low pressure radial port in said cylindrical walls extending all the way from one said end wall to said other end wall, a high pressure radial port in the cylindrical walls at the opposite side of the common plane through the rotor axes to said low pressure port extending from one end wall part of the way towards the other end wall, said travelling pockets moving peripherally and axially during the operation of the machine and changing their volume as they move from a first position where they are disconnected from said inlet port to a second position where they are connected to said outlet port, a first fluid conduit in the housing in flow communication with said chambers through said low pressure port, and a second fluid conduit in the housing in flow communication with said chambers through said high pressure port, complementary axial ports in said end walls in flow communication with said chambers and conduits, respectively, and said main rotor threads having a wrap angle at the pitch circle ranging between 330° and 450° effective to commence compression in a main rotor groove before the low pressure port to said groove is closed, and when the machine is operated as a compressor, and effective to open the low pressure port to a main rotor groove before the expansion is finished in said groove, when the machine is operated as an expander or motor.

References Cited

UNITED STATES PATENTS

| | | | |
|---|---|---|---|
| 2,425,000 | 8/1947 | Paget | 230—143 XR |
| 3,161,349 | 12/1964 | Schibbye | 230—143 |
| 3,209,990 | 10/1965 | Akerman | 230—143 |
| Re. 23,015 | 6/1948 | Yingling | 230—42 XR |
| 2,457,314 | 12/1948 | Lysholm | 230—143 |
| 2,804,260 | 8/1957 | Nilsson et al. | 230—139 |
| 2,999,466 | 10/1961 | Hornschuch et al. | 103—128 |

DONLEY J. STOCKING, *Primary Examiner.*

LEONARD H. GERIN, *Assistant Examiner.*